United States Patent [19]
Andres

[11] 3,984,145
[45] Oct. 5, 1976

[54] RETAINING MECHANISM FOR ADJUSTABLE VEHICLE SEATS

[75] Inventor: Rudolf Andres, Sindelfingen, Germany

[73] Assignee: Daimler-Benz Aktiengesellschaft, Germany

[22] Filed: Jan. 31, 1975

[21] Appl. No.: 546,127

[30] Foreign Application Priority Data
Feb. 1, 1974   Germany............................ 2404864

[52] U.S. Cl................................. 297/216; 297/388
[51] Int. Cl.²......................................... B60R 21/10
[58] Field of Search.................. 297/388, 385, 216;
242/107.4 C, 107.2; 244/122 B, 122 R;
280/150 SB; 24/75 R, 77 R, DIG. 1, 196;
160/291, 293 R, 296; 248/394, 395, 429

[56] References Cited
UNITED STATES PATENTS

| | | | |
|---|---|---|---|
| 3,204,916 | 9/1965 | Pickels............................... | 248/429 |
| 3,207,554 | 9/1965 | Dall................................ | 248/429 X |
| 3,227,489 | 1/1966 | Stubblefield........................ | 24/77 R |
| 3,240,510 | 3/1966 | Spouge........................... | 280/150 SB |
| 3,288,422 | 11/1966 | Kruse.................................. | 248/429 |
| 3,811,727 | 5/1974 | Runpel............................ | 297/216 X |
| 3,845,987 | 11/1974 | Bashford.......................... | 297/216 X |

*Primary Examiner*—James T. McCall
*Attorney, Agent, or Firm*—Craig & Antonelli

[57] ABSTRACT

A retaining installation for adjustable vehicle seats, adjustable preferably in different planes, at which at least one free end of a retaining system is pivotally mounted; means are thereby provided which yieldingly connect the vehicle seat during normal driving operation independently of the position thereof with at least one fixed vehicle part and which upon exceeding a predetermined force acting on the retaining system or the seat, establish a fixed connection between the seat and the fixed vehicle part.

16 Claims, 6 Drawing Figures

RETAINING MECHANISM FOR ADJUSTABLE VEHICLE SEATS

The present invention relates to a retaining mechanism for adjustable vehicle seats, preferably adjustable in different planes, at which is pivotally connected at least one free end of a retaining system.

Vehicle seats of different constructions are known in the art which are adjustable in different direction in order that above all the driver can bring himself into the correct position with respect to the steering wheel, the foot pedals and the instrument panel, taking into consideration his body dimensions.

With the use of safety belts, it is desirable for reasons of comfort and for attaining an optimum pulling or tensioning direction for the belt band of the safety belt to mount either all of the fastening points of the safety belt or at least some of the fastening points at the vehicle seat. Since the safety belts are subjected to high loads and stresses, considerably more stable and sturdy vehicle seats and seat fastening means are necessary for absorbing the belt forces than was the case as a rule heretofore. This means that the vehicle seats become altogether heavier and therewith more expensive.

The present invention is therefore concerned with the task to provide an arrangement which makes it possible to mount the free ends of the safety belts at the vehicle seat without having to specially reinforce the seats and the fastening means thereof.

Accordingly, it is proposed to provide according to the present invention means which yieldingly connect the seat in the normal driving operation independently of the position thereof with a fixed vehicle part and which upon exceeding a predetermined force acting on the retaining system or on the seat, establish a fixed connection between the seat and the fixed vehicle part.

In one advantageous embodiment of the present invention, the means consist of at least one mechanism operating in the manner of a self-locking belt or cable roll-up device whose locking member is operatively connected with a safety belt receptacle constructed preferably as belt lock.

In another embodiment of the present invention, the locking member forms a part of a slide bar extending out of a housing which, when the retaining system is not under load, abuts at an abutment or stop projecting from the housing of the roll-up mechanism owing to the force of a spring whereby the locking member, beginning with a predetermined tensional load of the retaining system, lockingly engages into the detent wheel of the mechanism.

In a further embodiment of the present invention, the installation may be fixedly connected with the seat and the belt part adapted to be pulled out may be connected with a fixed vehicle part.

In a further embodiment of the present invention, the installation may be securely connected with the seat and the belt part adapted to be pulled out — extended about deflecting places fixed at the vehicle — may also be connected securely with the seat.

A further advantageous embodiment of the present invention can be achieved when the housing of the installation is mounted at a fixed vehicle part and the belt part adapted to be pulled out is fixedly connected respectively with the seat.

Finally, it may also be additionally of advantage if the installation is displaceably arranged at a fixed vehicle part in the pulling direction of the side bar and of the belt part adapted to be pulled out.

Accordingly, it is an object of the present invention to provide a retaining system for adjustable vehicle seats which avoids by simple means the aforementioned shortcomings and drawbacks encountered in the prior art.

Another object of the present invention resides in a retaining system for adjustable vehicle seats which permits a fastening of the free ends of the safety belt at the vehicle seat, yet eliminates the need for reinforcing the seats, particularly the mounting and fastening means thereof.

A further object of the present invention resides in a retaining system for adjustable vehicle seats in which a fixed connection between the seat and a fixed vehicle part is established by simple means when a force acts on the retaining system or on the seat which exceeds a predetermined force.

A still further object of the present invention resides in a retaining system of the type described above which is simple in construction, involves relatively few inexpensive parts and can be readily installed into a vehicle.

These and other objects, features and advantages of the present invention will become more apparent from the following description when taken in connection with the accompanying drawing which shows, for purposes of illustration only, several embodiments in accordance with the present invention, and wherein.

Figure 3:
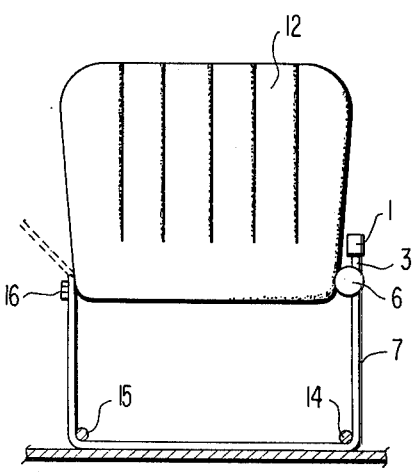
FIG. 3 is a somewhat schematic plan view, similar to FIG. 2, on a modified embodiment of a vehicle seat with deflecting places for the belt band which are fixedly mounted at the vehicle.
Figure 4:
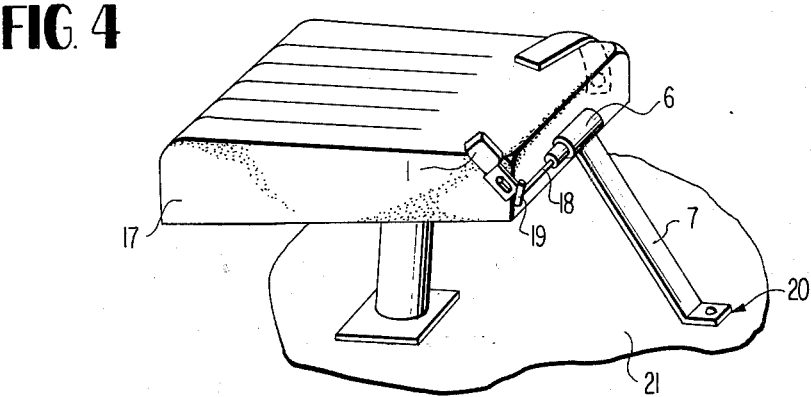
FIG. 4 is somewhat schematic side elevational view of a vehicle seat equipped in accordance with the present invention, for example, a pivot seat, with the backrest thereof omitted for the sake of clarity.
Figure 5:
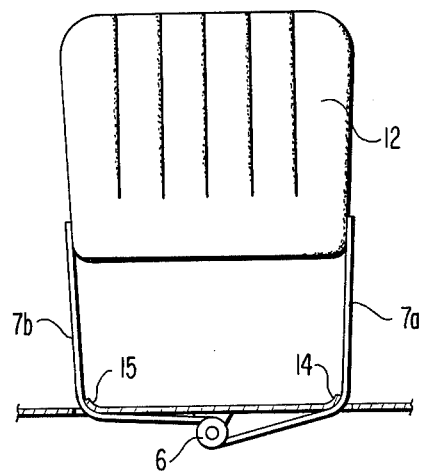
Figure 6:
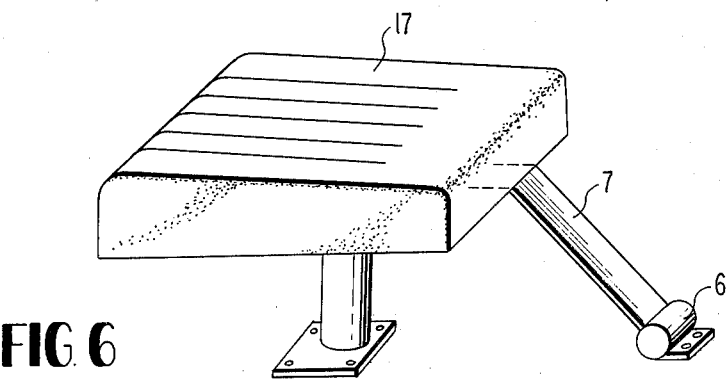

FIG. 5 is a somewhat schematic plan view, corresponding to FIG. 3, of a still further modified embodiment of a vehicle seat with deflecting places fixed at the vehicle as well as with fastening means of the installation also at a fixed vehicle part; and FIG. 6 is a somewhat schematic side elevational view of a still further modified embodiment of a vehicle seat corresponding to FIG. 4 with another possibility of the arrangement of an installation according to the present invention.

Figure 1:
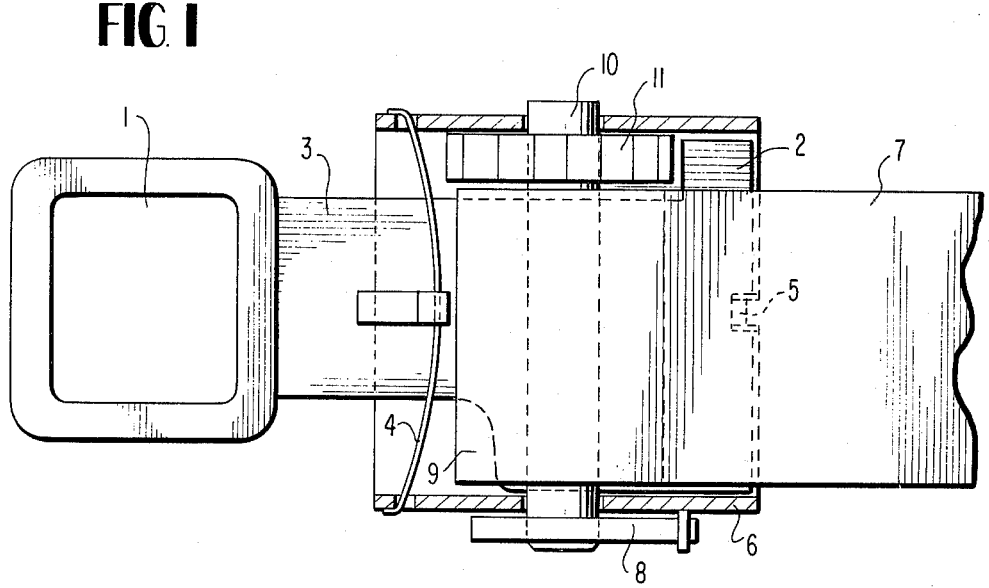
FIG. 1 is a plan view, partly in cross section, of a belt roll-up device with a belt-lock in accordance with the present invention which is self-locking in dependence of the tensional or pulling force.

Referring now to the drawings wherein like reference numerals are used throughout the various views to designate like parts, and more particularly to FIG. 1, this figure illustrates somewhat schematically a safety belt receiving member 1 preferably constructed as conventional belt lock which is fixedly connected with a slide bar 3 provided with a locking member 2. A spring 4 presses the slide bar 3 into its normal position against an abutment 5 at the housing 6 of the belt roll-up mechanism of conventional type and thus enables the unimpeded pulling out of the belt band 7 and therewith the full freedom of movement of the strapped-in vehicle passenger whereby a return spring 8 brings about in a conventional manner the rolling-up of the loose belt band 7 on a roll 9 which is securely mounted on a shaft 10 rotatably supported in the housing 6.

At a predetermined load of the retaining system due to a pull at the belt lock 1, the locking member 2 of the slide bar 3 engages into a detent wheel or gear 11 serving as locking member which is rigidly connected with the shaft 10, and thereby blocks the pulling out of the belt band 7.

Figure 2:
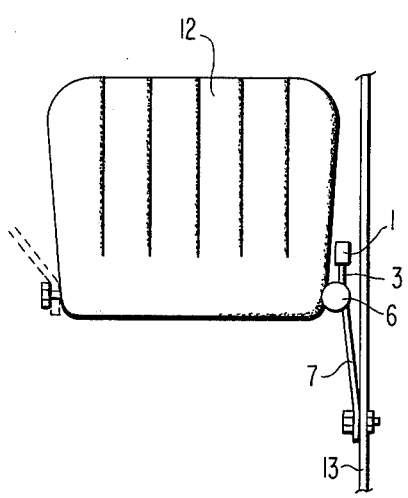
FIG. 2 is a somewhat schematic plan view on a vehicle seat without the backrest thereof provided with an installation arranged in accordance with the present invention.

FIG. 2 illustrates a retaining installation of the type described hereinabove with a belt lock 1, a side bar 3 and a housing 6 which is fixedly mounted at the vehicle seat 12. The seat 12 is retained on one side thereof by the belt band 7 adapted to be pulled out when the seat is adjusted, which is secured at its free end at a part 13 fixed with the vehicle.

FIG. 3, in contrast to FIG. 2, illustrates an anchoring of the vehicle seat 12 on both sides whereby the correspondingly extended belt band 7 is guided about deflecting places 14 and 15 fixed at the vehicle and at 16 is again connected with the vehicle seat 12.

FIG. 4 illustrates a pivoting vehicle seat 17 not illustrated in detail, with a retaining mechanism which essentially consists of a belt lock 1 and of a belt housing 6 of a belt roll-up mechanism mounted at the pivoting seat 17. At a predetermined tensional load of the retaining system, the locking function is inititated. A cable connection 18 secured at the belt lock 1 which passes over a deflection 19, acts lockingly in a conventional manner not illustrated in detail on a detent gear wheel provided in the detent housing 6. The belt band 7 is thereby connected, on the one hand, with the locking mechanism of conventional construction arranged within the housing and, on the other, at 20 with a fixed vehicle part 21.

FIG. 5 illustrates a further embodiment of a retaining installation consisting of a housing 6 fixedly mounted at a fixed vehicle part of a belt roll-up mechanism with two belt band parts 7a and 7b adapted to be pulled out in opposite directins by way of deflecting places 14 and 15 fixed at the vehicle; the free ends of the belt band parts 7a and 7b are thereby secured at the vehicle seat 12. A locking member of any conventional type such as, for example, a pendulum which operates in dependence on deceleration, is installed in the housing 6. However, also an embodiment (not shown) is feasible within the scope of the present invention in which the housing 6 is displaceably supported in a rail fixed at a fixed vehicle part and a connection to the vehicle seat consists of an extended side bar 3 (FIG. 1) with a locking member and of a belt band part adapted to be pulled out.

FIG. 6 finally illustrates a retaining mechanism fixedly mounted at a relatively fixed vehicle part according to FIG. 5, which consists of a housing 6 with a built-in locking member and of a belt-band part 7 adapted to be pulled out, which is secured at the vehicle seat. However, it is also possible to displaceably support the housing 6 in a rail fixedly mounted at a relatively fixed vehicle part and to establish the connection to the vehicle seat 17 by an extended side bar or strap and furthermore to arrange a belt part (FIG. 1) adapted to be pulled out which is mounted at a fixed vehicle part. In this case, a locking mechanism responsive to deceleration would then have to be provided.

All of the described embodiments offer the advantage that the forces transmitted onto the vehicle seat in case of a load of the retaining system are introduced directly into a fixed vehicle part in by-passing the guide and adjusting mechanisms of the seat.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A retaining installation for adjustable vehicle seats comprising
 a retaining system having at least one free end pivotally connected with an adjustable vehicle seat, said retaining system including a safety belt receiving means, and
 means for yieldingly connecting said vehicle seat with at least one fixed vehicle part independently of the position of said seat, said means establishing a rigid connection between said vehicle seat and said fixed vehicle part upon exceeding a predetermined force acting on one of the two parts consisting of said retaining system and said vehicle seat,
 wherein said means includes at least one self-locking roll-up mechanism having a locking means operatively connected to said safety belt receiving means for locking said roll-up mechanism upon exceeding said predetermined force.

2. A retaining installation according to claim 1, wherein said safety belt receiving means is a safety belt lock.

3. A retaining installation according to claim 2, wherein said roll-up mechanism is a belt roll-up device.

4. A retaining installation according to claim 2, wherein said roll-up mechanism is a cable roll-up device.

5. A retaining installation according to claim 2, wherein said locking means includes a locking member extending out of a housing means, said locking member abutting in a non-loaded condition of said retaining system at a stop projecting from said housing means owing to the force of a spring, and wherein said locking member, beginning with a predetermined tensional load of the retaining system, lockingly engages into a detent wheel of said roll-up mechanism.

6. A retaining installation according to claim 5, wherein said roll-up mechanism is fixedly connected to said vehicle seat and a belt portion adapted to be pulled out of said roll-up mechanism is fixedly connected to said at least one fixed vehicle part.

7. A retaining installation according to claim 5, wherein said roll-up mechanism is fixedly connected to said vehicle seat and a belt portion adapted to be pulled out of said roll-up mechanism is also fixedly connected to said vehicle seat.

8. A retaining installation according to claim 7, wherein said belt portion in its connection with the seat extends about deflecting means mounted at said fixed vehicle part.

9. A retaining installation according to claim 5, wherein said housing means is mounted at said relatively fixed vehicle part and a belt portion adapted to be pulled out of said roll-up mechanism is respectively securely connected to said vehicle seat.

10. A retaining installation according to claim 5, wherein said roll-up mechanism is displaceably arranged at said fixed vehicle part in the pulling direction of the side bar and of a belt part adapted to be pulled out of said roll-up mechanism.

11. A retaining installation according to claim 1, wherein said roll-up mechanism is fixedly connected to said vehicle seat and a belt portion adapted to be pulled out of said roll-up mechanism is fixedly connected with at least one fixed vehicle part.

12. A retaining installation according to claim 1, wherein said roll-up mechanism is fixedly connected to said vehicle seat and a belt portion adapted to be pulled out of said roll-up mechanism is also fixedly connected to said vehicle seat.

13. A retaining installation according to claim 12, wherein said belt portion in its connection with the seat extends about deflecting means mounted at said fixed vehicle part.

14. A retaining installation according to claim 1, wherein said roll-up mechanism is mounted at said relatively fixed vehicle part and a belt portion adapted to be pulled out of said roll-up mechanism is respectively securely connected to said vehicle seat.

15. A retaining installation according to claim 1, wherein said roll-up mechanism is displaceably arranged at said fixed vehicle part in the pulling direction of said locking means and of a belt part adapted to be pulled out of said roll-up mechanism.

16. A retaining installation according to claim 1, wherein said vehicle seat is adjustable in different planes.

* * * * *